Fig. 2

Dec. 28, 1954     C. A. SCHNEIDER ET AL     2,698,067
SATURABLE REACTOR CONTROL SYSTEM FOR ELEVATOR MOTORS
Filed Jan. 22, 1952     6 Sheets-Sheet 3

INVENTORS.
Carl A. Schneider.
Harold E. Hancock.
BY Wood, Herron & Evans.
ATTORNEYS.

INVENTORS.
Carl A. Schneider,
Harold E. Hancock.
BY Wood, Herron & Evans.
ATTORNEYS.

Fig.9

United States Patent Office 2,698,067
Patented Dec. 28, 1954

2,698,067

SATURABLE REACTOR CONTROL SYSTEM FOR ELEVATOR MOTORS

Carl A. Schneider, Madeira, and Harold E. Hancock, Loveland, Ohio, assignors to The Shepard Elevator Company, Cincinnati, Ohio, a corporation of Ohio Application January 22, 1952, Serial No. 267,618

20 Claims. (Cl. 187—29)

This invention relates to elevator control systems, and is particularly directed to a novel system in which the position and velocity of an elevator cab are controlled electrically during its entire operating cycle so that the cab may be accelerated and decelerated in a predetermined manner and brought into accurate alignment with the various floors of a building.

There are several desiderata of a modern elevator system. In the first place, emphasis is placed upon speed. In order that an elevator system can serve a maximum number of people, it must be able to make each run in a minimum amount of time. This means that an elevator preferably has a high top speed and travels over a large portion of its run at this speed. Furthermore, while it is desirable that the cab be accelerated and decelerated rapidly, its motion should be smooth and not subject to jerks or bumps.

It is also very important that the elevator system should function so that the cab is brought into accurate vertical alignment with each of the floors at which it is stopped. If the cab floor is not accurately leveled with the building floor, passengers may trip on entering or leaving the cab, and the transfer of heavy freight into or from the cap is seriously impeded. Finally, it is desirable that the cab should be brought into the proper floor level in one smooth continuous motion, the cab deceleratiang as it approaches the floor and then stopping at exactly the right height. If the cab is stopped a few inches from the floor and then jogged into place, the passengers are jarred and appreciable unnecessary time is consumed.

One of the principal difficulties in providing a system which will have all of these features is that heretofore it has been necessary, in order to obtain one good operating characteristic, to sacrifice another. Thus, for example, if accurate leveling was obtained, the elevator required considerable more time to make a run; and if high speed was obtained, the passengers were jarred about, and often the cab was brought to rest a substantial distance from the proper floor level position. Part of this difficulty is due to the fact that it is practically impossible to mechanically brake a cab, which is moving at a high velocity, so that it will be brought to rest in precise alignment with the floor of a building, without either reducing the cab velocity before the brake is applied, or jogging the cab into its final position after it has been brought to rest at a point relatively near the floor.

Jogging a cab into position is not desirable for several reasons; among them, the annoyance to passengers when a cab is jogged one or more times after it has been stopped, but before it is brought into final alignment with the floor. Furthermore, jogging the cab into position requires appreciable time, so that much of the advantage of a high speed elevator system is lost in time consumed correcting for misalignment of the cab with the floor at which it is stopped.

Several elevator systems currently in use resort to the first alternative mentioned, that is, they include means for lowering the elevator cab speed before the brake is applied. Typical systems of this kind employ multiple speed A. C. motors, or often two or more motors connected to the same shaft. Other systems employ a variable speed D. C. motor. For example, in the Ward-Leonard system the driving motor is a D. C. motor having a variable field exitation supplied by an auxiliary motor-generator set. In these systems the motor speed is reduced while the cab is still a considerable distance from the floor and then the mechanical brake is applied. While better leveling is secured with these systems, they all have the disadvantages of being both bulky and expensive.

In our copending application, Serial No. 218,134, filed March 29, 1951, we disclosed a leveling system in which may of the disadvantages of a single speed motor system are overcome without resorting to a multiple speed motor or an auxiliary motor-generator set. In the system therein disclosed, a single speed motor is used to drive an elevator cab, and the point of brake application is varied in accordance with the load and velocity of the cab. While this system greatly improves the performance of single speed motor driven cabs, it is not completely satisfactory, since at times the cab still requires correcting movements to bring it into proper floor alignment.

There are many variable factors which influence the accuracy with which an elevator cab may be stopped in alignment with a floor by means of a friction brake. These factors can never be compensated for beforehand, and will result, at times, in the cab coming to a stop a considerable distance from the floor. For example, the effectiveness of a friction brake to stop an elevator cab depends upon such varying conditions as: temperature, humidity, the amount of oil which has been applied, and the like. Also the brake coefficient of friction varies greatly with the cab velocity. It is practically impossible to control these conditions to such an extent that an elevator cab can be correctly positioned whenever it stops at a floor, without first requiring one or more corrective movements.

The present invention is predicated upon the concept of securing accurate leveling without corrective movements by eliminating the friction brake as a control element of cab movement, and instead, bringing the cab to a stop by plugging the driving motor. Furthermore, it is the concept of the present invention to provide smooth acceleration and deceleration by making a variable speed motor of an ordinary three phase motor. This is accomplished by placing a saturable reactor in the motor power supply circuit. By means of the saturable reactor, the cab may be accelerated smoothly from rest to maximum velocity, and then as the cab approaches the floor, the motor plugging force may be controlled so that the cab is brought to a smooth and accurate stop. All of the variables of friction brake operation are thereby eliminated, and the entire operating cycle of the elevator cab is electrically controlled.

One typical elevator system constructed in accordance with this invention includes an elevator cab which is raised or lowered by means of a single speed alternating current motor such as a polyphase induction motor. The system is arranged so that the cab may be summoned to any floor in response to the depression of a call button located on that particular floor, or may be directed to a selected floor by the depression of a cab button located within the cab.

Control over motor operation is exercised by two control elements in the motor supply circuit. One of these elements consists of a set of contactors for opening and closing the motor power circuit, and reversing of the sequence of the voltage supplied to the motor for driving it in either direction or plugging it as required. The other control element is a saturable reactor for varying the voltage applied to the motor to change the speed of motor rotation. Operation of these elements is controlled by a comparator circuit in such a manner that the elevator motor forms one element of a closed loop, null-seeking servo-mechanism. That is, when the cab is at rest, in proper alignment with the selected floor, the voltage in the comparator circuit is zero. The comparator circuit controls the motor contacts so that the cab is always operated in the direction which will reduce the voltage in the comparator circuit to zero.

The comparator circuit includes three voltage sources. One voltage, the "floor voltage," is proportional to the height of the selected floor above an arbitrary reference level; a second, or "cab position voltage," is proportional to the height of the elevator cab above the same reference level, and a third, or "velocity" signal, is proportional to the elevator cab speed. These voltages, in the comparator circuit, may be either alternating or direct. For reasons to be explained later, I have found that the use of alternating voltages is preferable, and in the description that follows it will be assumed that the voltages in the circuit are of this type. The cab position voltage is placed in series with the floor position voltage in such a manner that the two are of opposite phase. Their amplitudes are such that when the cab is properly leveled at the selected floor, the sum of the two voltages will be zero. If the cab is not properly leveled, the sum of the cab position voltage and floor position voltage will result in a "position error" voltage which will have a phase dependent upon the relative position of the cab and selected floor, and an amplitude dependent upon the distance between the two.

The velocity signal is preferably supplied by a tachometer or small voltage generator which is mechanically interconnected with the motor. The output of the tachometer is connected in series, with the cab position voltage and the floor signal in such a manner that whenever the cab is running toward the selected floor, the phase of the velocity signal is the same as that of the cab position signal. Thus, the velocity signal subtracts from the floor signal in the same manner as the cab position signal. The sum of these voltages, which is the total voltage of the comparator circuit, will be termed the "driving voltage."

In the preferred embodiment of our elevator control system two different voltages of the comparator circuit are used to actuate the control elements. These voltages are the driving voltage which is the total voltage of the comparator circuit and the velocity voltage which is merely the output of the tachometer generator. Each of these voltages is amplified and is then used either to operate the contactors or the saturable reactor.

The outputs of both the driving velocity amplifier and the velocity voltage amplifier are utilized to perform several different functions. In the preferred embodiment, each amplifier consists of a number of channels, the output of each channel being used to perform a single function. Obviously many modifications can be constructed so that, for example, a large number of separate, single channel amplifiers could be used in place of the two multi-channel amplifiers shown. In the description that immediately follows, reference will be made only to a single velocity voltage amplifier and a single driving voltage amplifier. The basic principles of operation will be the same, however, if a modified amplifier arrangement is used.

Principally, the output of the driving voltage amplifier controls which of the contactors is closed in the motor supply circuit, and also controls the impedance of the saturable reactor for varying motor speed. The velocity voltage amplifier controls contacts for shorting out the saturable reactor to enable the cab to reach maximum speed, and also opens the motor energization circuit entirely and applies the brake whenever the cab arrives at the selected floor and is traveling below a predetermined velocity.

Generally, the operation of the cab involves first establishing a call by depressing either a call or cab button. This results in a position error voltage being developed in the comparator circuit due to the difference between the cab position voltage and the floor signal. Since the cab is not initially in motion, the tachometer voltage is zero, and this position error signal constitutes the entire driving voltage which is amplified and used to actuate the appropriate contacts in the motor supply circuit. The motor is driven in a direction so that the driving voltage is reduced and the cab starts to move toward the selected floor.

When the motor is initially energized, the current flowing in the control coil of the saturable reactor has not yet effectively saturated the reactor so that the reactor line coils have a high impedance. Consequently only a portion of the supply line voltage is applied to the motor, which begins to rotate slowly. There is a time lag before the driving voltage becomes effective to saturate the reactor and lower its impedance. During this time lag, the motor is smoothly accelerated until it reaches a substantial portion (perhaps 80–90%) of maximum speed. After the cab has reached this predetermined velocity, the tachometer signal becomes large enough to operate a set of contacts shorting out the saturable reactor and bringing the cab up to maximum velocity.

The cab will continue at maximum velocity until it approaches within a few feet of the selected floor. At this time the driving voltage, which has been steadily decreasing, reaches zero, dropping out the motor contactors, deenergizing the motor. As the cab continues to move downwardly, the velocity signal exceeds the position error signal and the polarity of the driving voltage reverses so that the opposite contactor is energized supplying reverse phase sequence voltage to the motor, plugging it to exert an effective braking action on the cab. The amount that the motor is plugged again depends upon the magnitude of the driving voltage, since this voltage is amplified and supplied to the control coil of the reactor.

As the cab approaches the selected floor, the position error voltage approaches zero. The driving voltage regulates the plugging of the motor so that the cab velocity also decreases to zero. When the cab is within a small fraction, for example ⅛ of an inch, of the selected floor and is moving at only a few percent (preferably less than 5%) of its maximum speed, the motor will be completely deenergized, and the brake will be applied to hold the cab in position. It will be noted that the brake is not used to position the cab since at this low velocity the brake will set, stopping the cab practically instantaneously. Once the brake is applied, the cab travel will be negligible so that accurate leveling will be attained no matter what combination of variable brake factors is present.

Another aspect of this invention concerns the provision of an elevator control system which controls cab position and velocity, as just described, and which contains no electronic tubes. Such a control system is basically similar to the system just described, except that in place of electronic amplifiers, magnetic amplifiers are provided. This all magnetic system is extremely dependable and requires little or no electrical maintenance over long periods of constant usage.

One of the principal advantages of the preferred embodiment of our all magnetic elevator system is that normal variations in the voltage supply for operating the system are not reflected as errors of cab position. The significance of this will be realized from a consideration of the fact that the amplifiers must be phase sensitive in order to properly control the elements of the elevator system. Normally a phase sensitive magnetic amplifier requires a source of constant voltage to serve as a bias voltage. However, in an elevator system no source of constant voltage is conveniently available. We have found that the need for a source of bias voltage can be eliminated and the operation of the amplifier freed from effects of voltage fluctuations in a manner which will be explained later.

Another object of this invention is to provide an elevator control system including a call circuit and a comparator circuit which can be operated entirely by alternating current. An alternating current system provides more dependable operation and requires less frequent adjustment of the electrical components than does a similar direct current system. It is a well known fact that D. C. amplifiers are difficult to stabilize and do not have high gain characteristics. Consequently, if direct current is used in the signal and comparator circuits, more complicated amplifiers must be provided, and the circuits must be critically adjusted and frequently corrected. If these precautions are not taken, the system will not be sufficiently sensitive for accurate leveling or will soon get out of adjustment so that the cab stops at an appreciable distance from the selected floor.

In contrast with this, the A. C. call and comparator circuits of the preferred embodiment provide reliable operation whether electronic or magnetic amplifiers are employed. Furthermore, the electronic amplifiers are largely self-correcting, and are not as responsive to variations in the power supply as are D. C. amplifiers. Consequently, the control system will continue to operate effectively over long periods with only a minimum of adjustment and maintenance.

A further advantage of alternating current elevator systems is that portions of the circuit, for example the amplifiers, can be isolated from the rest of the system by means of a grounded isolation transformer. This again lends to increased stability of operating performance as well as economy of production.

Other objects and advantages of the present invention will be apparent from a further consideration of the following detailed description of the drawings illustrating one embodiment of our invention.

Figure 1:
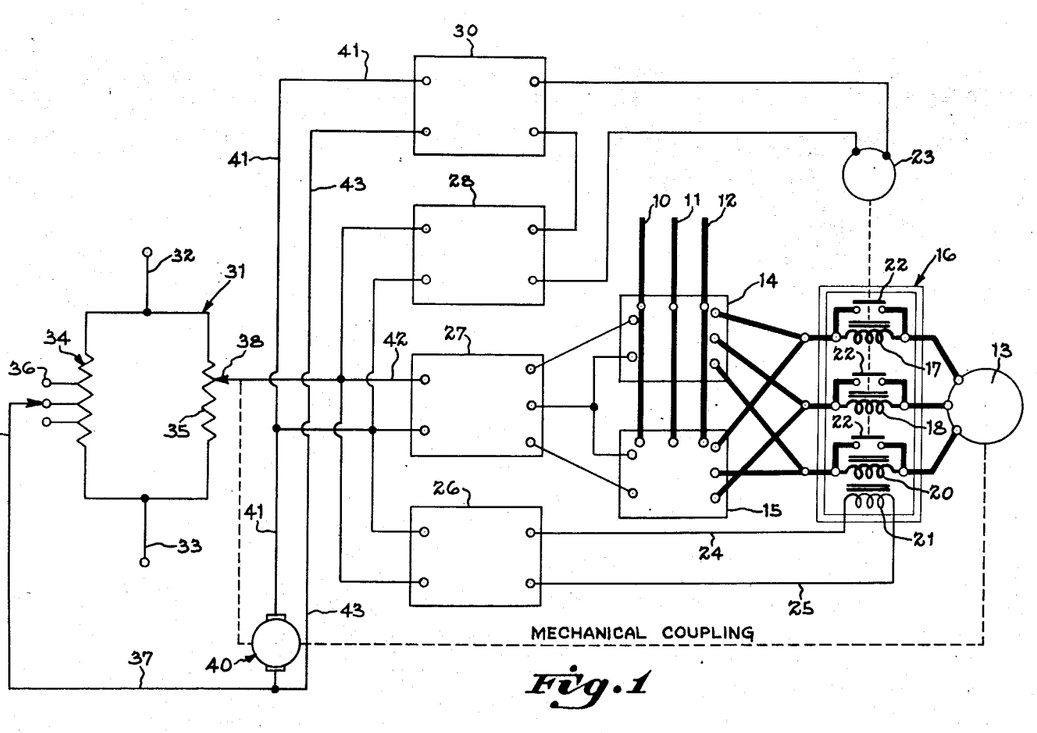
Figure 1 is a greatly simplified functional diagram of a saturable reactor elevator control system.

The saturable reactor control system shown diagrammatically in Figure 1 includes main power supply lines 10, 11, and 12 which energize motor 13 for driving an elevator cab. Motor 13 may be of any suitable type, such as a single speed polyphase induction motor.

Control over the power lines energizing motor 13 is exercised by "up" and "down" contactors 14 and 15, and saturable reactor 16. Up and down contactors 14 and 15 are effective to open and close the motor power circuit and to change the phase sequence in the power supply lines so that the direction of motor rotation is reversed. The saturable reactor 16 controls the power current supplied to motor 13, and hence, the speed at which the motor is driven. In other words, the saturable reactor control makes a variable speed motor of the ordinary induction motor.

Saturable reactor 16 is provided with coils 17, 18 and 20, each of which is placed in one line of the motor power circuit. The saturable reactor also includes a direct current control coil 21. By varying the amount of current flowing in coil 21, the impedance of coils 17, 18 and 20 can be varied over a wide range. When the current in control coil 21 is low, the impedance in coils 17, 18 and 20 is high and the motor rotates at a low speed. However, when the current in coil 21 is high, the reactor becomes saturated and coils 17, 18 and 20 have a very low impedance so that motor 13 is running at a high speed. For maximum motor speed, a plurality of contacts 22 are placed in shunt across each of the coils 17, 18 and 20 of the saturable reactor. These contacts are controlled by switch 23 and, when closed, short out the saturable reactor coils so that there is no impedance in the motor power supply circuit.

Control coil 21 is energized through leads 24 and 25 by the output of amplifier 26. The up and down contactors are energized by the output of amplifier 27, and switch coil 23 is controlled by the output of both amplifiers 28 and 30. The inputs of the various amplifiers are obtained from a comparator circuit indicated generally at 31.

Voltage for the comparator circuit is supplied through lines 32 and 33 across a tapped resistance 34 and potentiometer 35 connected in parallel. Lines 32 and 33 may carry either alternating or direct current but preferably supply alternate current to the comparator circuit for the reasons set forth above. In the following description it will be assumed that the comparator circuit is operated by an alternating current. If a direct current system were used, the amplifiers and relays would be polarity sensitive rather than phase sensitive, but the operation of the system would be generally the same. The variable resistance 34 is provided with a plurality of taps 36, the particular tap which is connected to line 37 being determined by the depression of a call button associated with the floor selected. The magnitude of the voltage drop or "floor level signal" across the resistance 34 is made proportional to the distance of the selected floor from some arbitrary reference level, preferably the bottom of the shaft. For simplicity, it will be assumed in the following description, that the reference level coincides with the bottom of the shaft. Potentiometer 35 has a movable tap 38 which is translated relative to the potentiometer in synchronism with the cab movement so that the voltage drop across the potentiometer or "cab position signal" is proportional to the distance of the cab above the bottom of the shaft.

A "position error" voltage representing the difference in height between the cab and the selected floor is thus obtained across line 37 and tap 38. This position error voltage will be zero when the voltage drops across the potentiometer 35 and variable resistance 34 are equal, that is, when the cab is properly aligned with the selected floor. If the cab is not level at the selected floor, the error voltage will have an amplitude proportional to the distance between the cab and selected floor, and its phase will indicate whether the cab is above or below the selected floor.

An output coil of a tachometer or small generator 40 is connected in series with line 37 and line 41. The armature of tachometer 40 is mechanically interconnected with motor 13. The tachometer will be described in more detail in conjunction with the description of Figure 2. It will suffice here to state that it has the characteristic that it generates a voltage signal, the amplitude of which is proportional to the speed of the cab. The phase of the output signal from the tachometer, or "velocity signal" is such that when the car is running toward the selected floor, the tachometer voltage is of a phase opposite to the floor position voltage, and hence subtracts from it in the same way as the cab position signal. Consequently the greater the cab velocity, the lower the difference which will exist between the floor level signal and the car position signal. The tachometer signal thus causes the position error voltage to reach zero before the cab actually levels with the floor, and the distance from the floor at which the position error voltage reaches zero is a function of the velocity of the cab.

I shall call the voltage sum of the velocity signal, the floor level signal, and the cab position signal, the "driving voltage." This voltage appears across lines 41 and 42, and is connected to the input side of amplifiers 26, 27, and 28. While amplifiers 26, 27 and 28 are shown as independent amplifiers, which they may in fact be, in the preferred embodiment their function is performed by a single amplifier Ad having one channel corresponding to amplifier 26 and a second channel corresponding to amplifier 27. The input of amplifier 30 appears across lines 41 and 43 and is equal to the output of the tachometer winding or the velocity signal. Amplifier 30 corresponds to one channel of velocity amplifier Av in the embodiment shown in Figure 2.

The output characteristic of amplifier 27 is such that for one phase of driving voltage the up relay contact 14 will be energized, and for the opposite phase the down relay contact 15 will be energized. Whenever either of these contacts is energized, line current is supplied to the motor through saturable reactor coils 17, 18 and 20. As shown, two of the lines on the output side of contactor 15 are reversed with respect to those of contactor 14 so that the motor is driven in one direction when the down contact 15 is energized, and in the opposite direction when the up contactor 14 is energized. The motor is thus made to run in such a direction as to reduce the amplitude of the driving voltage to zero so that the cab is always driven toward the selected floor.

The output of amplifier 26 is supplied through leads 24 and 25 to control coil 21 of saturable reactor 16. At the start of a run, acceleration of the cab is controlled by the time constant of the circuit supplying control coil 21. That is, the reactor is originally in an unsaturated state so that coils 17, 18 and 20 have a high impedance, and when contactor 14 or 15 is closed, full line voltage is not applied to motor 13. There is a time lag while the current in control coil 21 builds up and saturates reactor 16. During this time the impedance of coils 17, 18 and 20 is dropping and the motor is accelerating. As the motor approaches maximum speed, the velocity voltage supplied to amplifier 30 becomes sufficiently large to energize switch 23 which closes contacts 22 shunting the coils of the saturable reactor. (One function of amplifier 28 is to condition the energization circuit of switch 23 so that amplifier 30 can actuate that switch when the cab reaches a predetermined velocity.)

In operation, when a particular floor is selected, a tap 36 corresponding to the call button depressed, is connected to line 37 and a position error voltage is developed across lines 37 and 42. Since the cab is initially at rest, no voltage is produced by tachometer 40 and the driving voltage is equal to the position error signal. The phase of the driving voltage depends upon the relative position of the cab and selected floor, and determines whether the up or down contactor is energized by the output of amplifier 27.

When the motor power circuit is completed, saturable reactor 16 is in an unsaturated condition, and the impedance of coils 17, 18 and 20 is high. Thus only a fraction of the full line voltage is applied to motor 13, and it starts to rotate slowly. The driving voltage developed in the comparator circuit is also supplied to amplifier 26, the output of which goes to control coil 21. The current flowing in coil 21 rapidly saturates reactor 16 so that the motor and cab are accelerated. As the motor approaches synchronous speed, the tachometer voltage is increased to a point where switch 23 is sufficiently energized to close contacts 22 shorting out the saturable reactor so that the motor will reach maximum speed.

Figure 7:
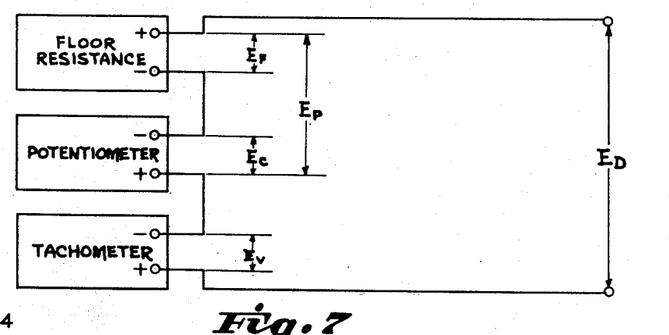
Figure 7 is a diagram labeled to show the relationship of the various voltages in the comparator network.
Figure 8:
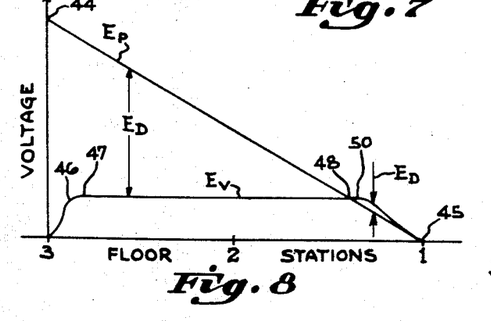
Figure 8 is a graph showing the relationship of the same voltages to elevator cab position.

The remainder of the operating cycle, or "run," can best be understood from a consideration of Figures 7 and 8. In Figure 7, the floor resistor and potentiometer are shown as being connected in opposition so that the instantaneous value of cab position voltage $Ec$ subtracts from floor level voltage $Ef$ to give position error voltage $Ep$. On any given run, this voltage will be at maximum when the floor button is first depressed. As shown in Figure 8, when a cab at floor 3 is called to floor 1, the position error signal is greatest while the cab is still at floor 3. This is indicated at 44. The position error voltage will decrease until it reaches zero when the cab and selected floor are aligned as at 45.

The tachometer is connected in series with the potentiometer and floor level resistance so that the velocity signal $Ev$ is of the same polarity as the cab position voltage $Ec$, hence the driving voltage $Ed$ is equal to the position error voltage $Ep$ minus the velocity signal $Ev$. Originally the velocity signal is zero, but as the cab is accelerated the velocity signal is increased as a function of cab speed. When the cab approaches synchronous speed, the velocity signal becomes sufficiently large, as at 46, to energize switch 23 shorting out the saturable reactor, whereupon the cab reaches maximum speed as at 47.

As the cab moves toward the selected floor, the driving voltage $Ed$ becomes smaller and smaller until it reaches zero when the position eror signal is equal to the velocity signal, as at 48. When the driving voltage becomes zero, the output of amplifier 28 becomes zero, causing switch 23 to open putting the coils of the saturable reactor back into the motor supply circuit; also the output of amplifier 27 is reduced to zero deenergizing the contactor and opening the motor power circuit. For an instant the cab is coasting downwardly. However, the removal of the motor power circuit supply does not cause the cab to slow down appreciably so that the velocity signal $Ev$ soon becomes greater than the position error signal $Ep$. This causes a new driving voltage $Ed$ to be developed, as indicated at 50, having a polarity opposed to that of the driving voltage previously developed in the comparator circuit.

This driving voltage energizes the opposite contactor from the one previously energized, so that the power circuit to the motor is reapplied but with the phase sequence reversed so that the motor is plugged. That is, the force exerted on the rotor tends to make it rotate in the direction opposite to that in which it is turning. The motor thus exerts a very effective braking action on the cab.

The new driving voltage controls the amount of plugging of the motor, through amplifier 26 and coil 21 of the saturable reactor, in such a manner that the voltage signal $Ev$ is made to approach the position error voltage $Ep$. In other words, after the cab passes the point 48 at which the cab velocity signal $Ev$ is equal to the position error voltage $Ep$, the driving voltage tends to make the cab speed decrease in accordance with the decrease in position error signal until the cab finally arrives at the floor with zero velocity. Actually, as shown in Figure 8, after the cab passes point 48, it is always traveling with a velocity greater than the velocity it would have if it were decelerating linearly with the position error signal. However, as the cab nears the floor, the cab velocity becomes quite small and the deceleration is substantially linear during the last foot or so.

The controlled deceleration is accomplished by the output of amplifier 26 which supplies current to control coil 21 of the saturable reactor. The input of amplifier 26 is the driving voltage $Ed$ and the amplifier operates so that the amount of current in coil 21 varies as a function of this voltage. The more the cab velocity signal exceeds the position error voltage, the greater the current which will flow in coil 21, and the greater the saturation of reactor 16. Greater saturation of reactor 16 results in an increase in the plugging current supplied to the motor which causes it to exert a greater braking action on the cab. In this manner the cab velocity is smoothly decreased from maximum speed, when the cab is a few feet from the floor, to zero velocity, when the cab is aligned with the selected floor. When the cab arrives at the selected floor, the driving voltage again becomes zero, opening the main contactor and motor supply circuit.

When both the driving voltage and velocity signal are equal to zero, or in actual practice, when the cab is moving at very small velocity (only a few percent of synchronous speed) and is within a small fraction, for example ⅛ of an inch of the selected floor, the mechanical brake will be applied to hold the cab. The manner in which this is accomplished will be explained in greater detail below. It will be noted, however, that the function of the mechanical brake is not to stop the cab, but to hold it in alignment with the selected floor after it has been brought into position by the saturable reactor control system.

Figure 2:
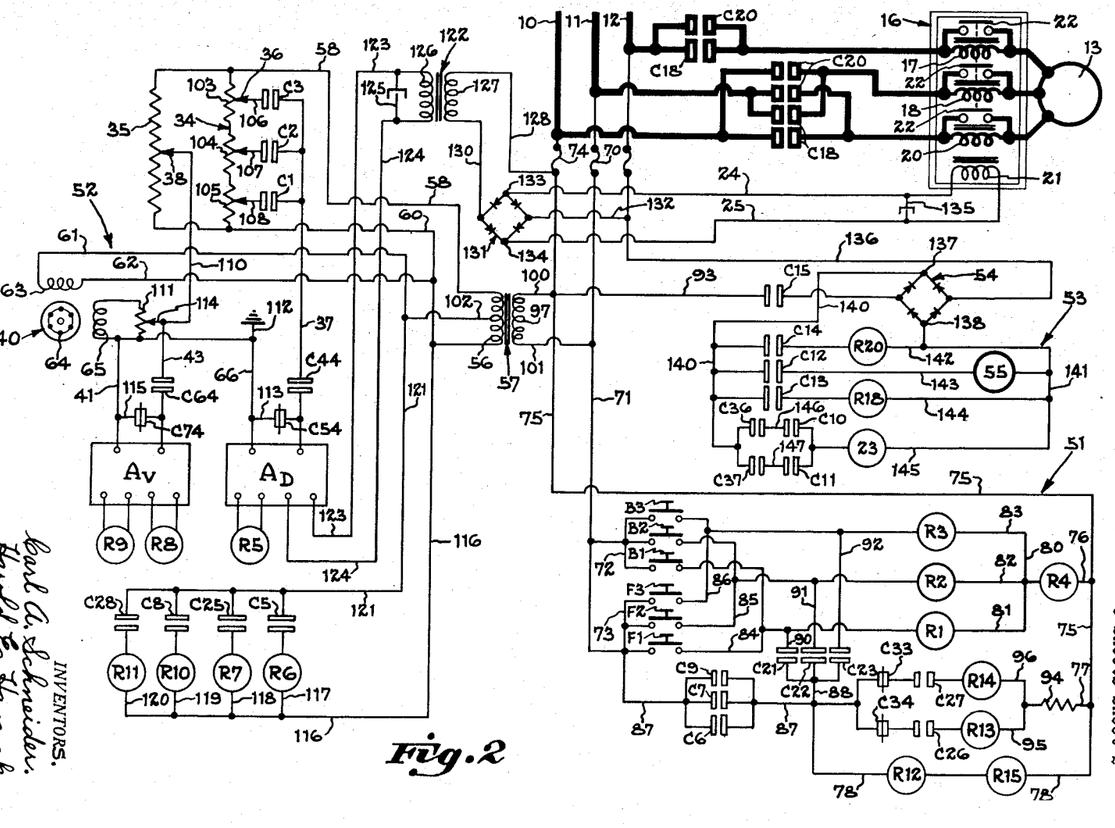
Figure 2 is a more detailed schematic circuit diagram of the saturable reactor control system shown in Figure 1.
Figure 9:
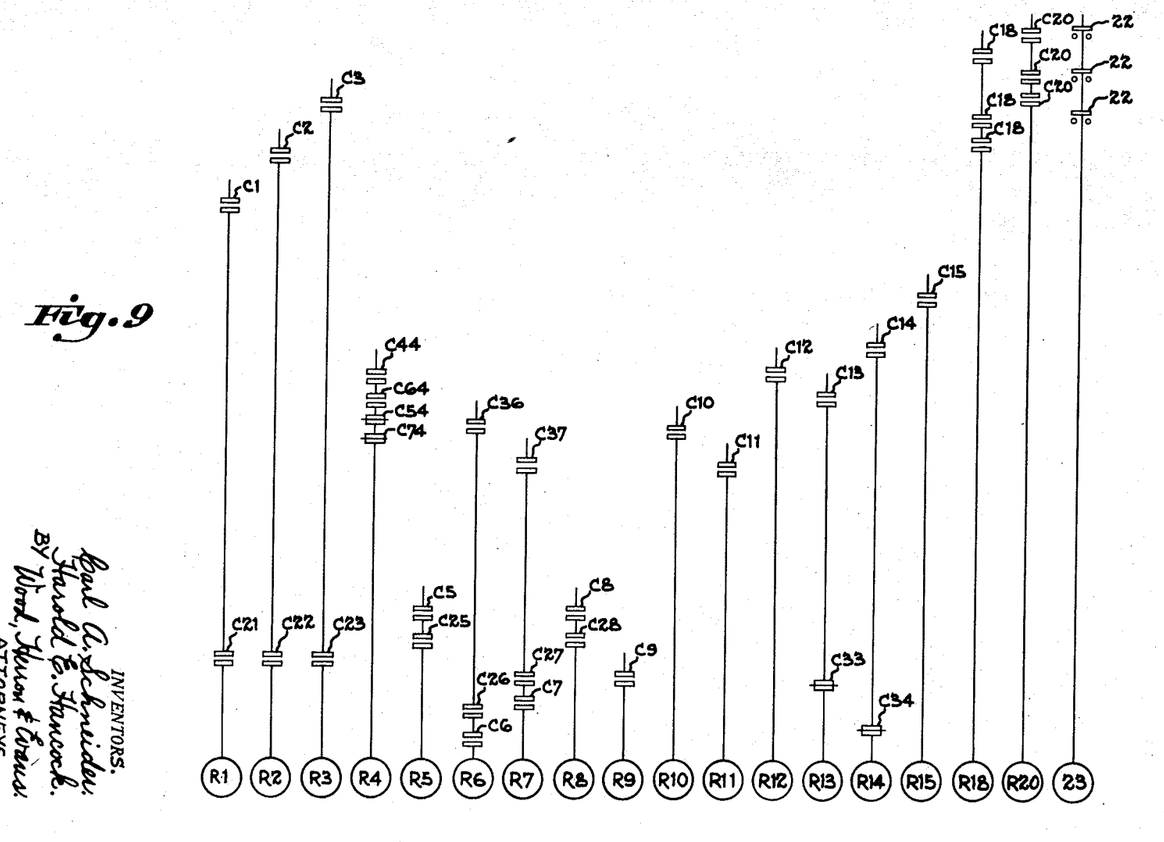
Figure 9 is a diagrammatic view, for use in conjunction with Figure 2, showing the relays and their associated contacts, the contacts being shown in the same vertical relationship on the page as the contacts in Figure 2.

Figure 2 is a schematic circuit diagram of the saturable reactor control system shown functionally in Figure 1. Figure 2 can best be examined in conjunction with Figure 9 which shows the relationship of the relay coils and their associated contacts. By placing Figures 2 and 9 in sideways alignment, the contacts of Figure 2 may be located by first locating their associated coil in Figure 9, following the line leading from that coil up the sheet to the point where the contact is marked, and then moving horizontally back to the contact in question. A three phase alternating current motor 13 for driving an elevator cab is energized from main power supply lines 10, 11 and 12. Operation of the motor is controlled by "down" contactor C18, "up" contactor C20, and saturable reactor 16. Saturable reactor 16 includes line coils 17, 18 and 20, each of which is placed in a power line of the motor supply circuit. The reactor is also provided with a control coil 21 by means of which the degree of magnetic saturation of the reactor can be varied to control the impedance of coils 17, 18 and 20. A series of contacts 22 which are controlled by switch coil 23 are shunted across each of the line coils of the saturable reactor.

The elevator control system, as shown, comprises essentially three circuits, the call button circuit indicated generally at 51, the comparator circuit 52, and the main contactor control circuit 53.

The main contactor control circuit 53 is powered by the D. C. output of a conventional bridge rectifier 54 and includes up and down relay coils R18 and R20 which actuate up and down contacts C18 and C20, and switch coil 23 which controls contacts 22 shunting the coils of the saturable reactor. The circuit also includes brake solenoid 55 for controlling the application of a mechanical friction brake (not shown). The brake arm and solenoid 55 are constructed so that the brake is released only when the solenoid is energized and is set if there is any interruption in the solenoid current supply.

The call button circuit 51 provides a means for selecting the floor to which the elevator cab is to be driven, and includes floor buttons F1, F2 and F3 which are located on the respective floors of a building, and cab buttons B1, B2 and B3 which are located within the cab. The depression of any of these buttons energizes a corresponding relay R1, R2 and R3, closing contact C1, C2 or C3 to connect particular tap 36 of floor level resistor network 34 to line 37. The depression of any of the call buttons also energizes relay coil R4, which closes the input circuit to the velocity signal amplifier $Av$ and the driving voltage amplifier $Ad$.

The comparator circuit 52 provides the input for amplifiers $Av$ and $Ad$. This circuit is energized from a secondary 56 of transformer 57. Secondary 56 is centrally tapped; and is connected through leads 58 and 60 across the potentiometer 35 and the floor level resistance network 34, which are arranged in parallel. One portion of secondary 56 is connected through leads 61 and 62 to winding 63 of tachometer generator 40. Tachometer 40 is preferably a two phase induction motor having an armature 64, mechanically interconnected with the motor 13, and two field windings 63 and 65 arranged at right angles to one another. One winding 63 is energized from transformer 57; the other winding 65 constitutes the output coil of the tachometer generator.

Floor level tap 36 is connected to one of the input leads 37 of the driving voltage amplifier A*d*. Output coil 65 of tachometer 40 and potentiometer tap 38 are connected in series to the other input lead 66 of the A*d* amplifier. The output of the driving voltage amplifier A*d* supplies current to control coil 21 of saturable reactor 16, and also energizes phase sensitive relay R5 which in turn operates a series of relays which close the circuit to actuate the up or down contactors. Relay R5 also conditions the energization circuit of switch coil 23 for control by the velocity voltage amplifier A*v*.

The input of the velocity voltage amplifier A*v* is supplied by the output field 65 of the tachometer generator 40 through leads 41 and 43. The output of one channel of the A*v* amplifier energizes relay R8 which closes the circuit to switch coil 23, shorting out the line coils of the saturable reactor after the cab has reached a predetermined velocity. The output of a second channel of the A*v* amplifier energizes relay coil R9 which closes contact C9 for maintaining a call signal circuit so long as the cab is moving above a certain velocity.

A more detailed description of the subcircuit arrangements of the call button circuit, comparator circuit, and main contactor circuit, as shown in the drawings, follows:

Call button circuit

The voltage for the call button circuit 51 is taken from power lines 10 and 11. Power line 11 is connected through fuse 70 and line 71 to conductors 72 and 73. Line 10 is connected through fuse 74 and line 75 to leads 76, 77 and 78. Lead 76 contains relay coil R4 and is joined to conductor 80. Three parallel lines 81, 82 and 83 join conductors 80 and 72. Each of the lines 81, 82 and 83 contains a cab button B1, B2 and B3, and a relay coil R1, R2 and R3. Leads 84, 85 and 86 join conductor 73 with lines 81, 82 and 83. Each of the leads 84, 85 and 86 contains a floor button F1, F2 and F3. Thus the circuit through relay R4 and any of the relay coils R1, R2 and R3 may be completed by depressing either of the corresponding cab or floor buttons.

Additionally, the relay circuit may be closed through a conductive path provided by lead 87 which contains three relay contacts C6, C7 and C9 in parallel, lead 88 and the parallel combination of hold contacts C21, C22 and C23 which are respectively joined by conductors 90, 91 and 92 to leads 81, 82 and 83. The holding contacts C21, C22 and C23 are actuated by relay R1, R2 and R3 respectively, and permit the relay circuit energized by the call buttons to remain energized until the elevator reaches the selected floor, even though the button originally closing the circuit is depressed only momentarily. Line 78 is connected across lines 75 and 87 and contains relay coil R12 having a contact C12 in series with brake solenoid coil 55 and relay coil R15 having a contact C15 in line 93 of the A. C. supply of rectifier 54. Line 77 is connected across lines 75 and 87 and includes resistance 94 and two parallel branches 95 and 96; branch 95 contains relay coil R13, normally closed contact C34 of relay coil R14, and contact C26 of relay coil R6. Branch 96 contains relay coil R14, normally closed contact C33 of relay coil R13 and contact C27 of relay coil R7.

Control circuit

Power for the comparator circuit 52 is furnished by a secondary 56 of transformer 57. Primary 97 of this transformer is connected across power lines 10 and 11 through leads 100 and 101. The secondary winding 56 of transformer 57 is provided with a center tap 102. One end of the secondary is connected through line 60 to one end of the floor level resistor 34 and potentiometer 35. The other end of secondary 56 is connected through lead 58 to the opposite end of the potentiometer and floor level resistance. The floor level resistance network 34 comprises series connected resistors 103, 104 and 105. Three taps 106, 107 and 108 pick off resistors 103, 104 and 105 respectively. Each of these taps is connected to line 37 through a contact C1, C2 or C3 operated by relay R1, R2 or R3 respectively. The voltage drop between line 37 and line 58 thus depends upon which of the relay contacts C1, C2 or C3 connects the resistor network to line 37. Line 37 is connected through contact C44 of relay coil R4 to the input side of the driving voltage amplifier A*d*.

Potentiometer coil 35, which is connected across lines 58 and 60, is provided with a tap 38. The coil and tap are moved relative to one another in synchronism with cab movement so that the voltage drop across line 58 and tap 38 is proportional to the height of the cab relative to some arbitrary reference level. Tap 38 is connected through leads 110 and variable resistance 111 to output coil 65 of tachometer 40. The other end of tachometer output coil 65 is connected to the input side of the driving voltage amplifier A*d* through lead 66; lead 66 being grounded as at 112. The input lines 37 and 66 of amplifier A*d* can be short circuited through lead 113 containing normally closed contact C54 of relay coil R4.

The input of the velocity amplifier A*v* is supplied through line 41 which is connected to one side of output coil 65 of tachometer 40, and line 43 containing contact C64 of relay coil R4. Line 43 joins tap 114 of variable resistance 111 which is shunted across output coil 65. Thus, the input of the velocity amplifier is a predetermined fraction of the output of the tachometer generator. The input leads 41 and 43 can be shorted by lead 115 containing normally closed contact C74 which is actuated by relay coil R4.

Another lead 116 is taken from secondary 56 of transformer 57 and a series of lines 117, 118, 119 and 120 are connected across lead 116 and line 121 which is joined to center tap 102. Line 117 contains relay coil R6 and contact C5 of relay coil R5. Similarly lines 118, 119 and 120 contain relay coils R7, R10 and R11 and contacts C25 of relay coil R5, C8 of relay coil R8, and contact C28 of relay coil R8.

Figure 3:
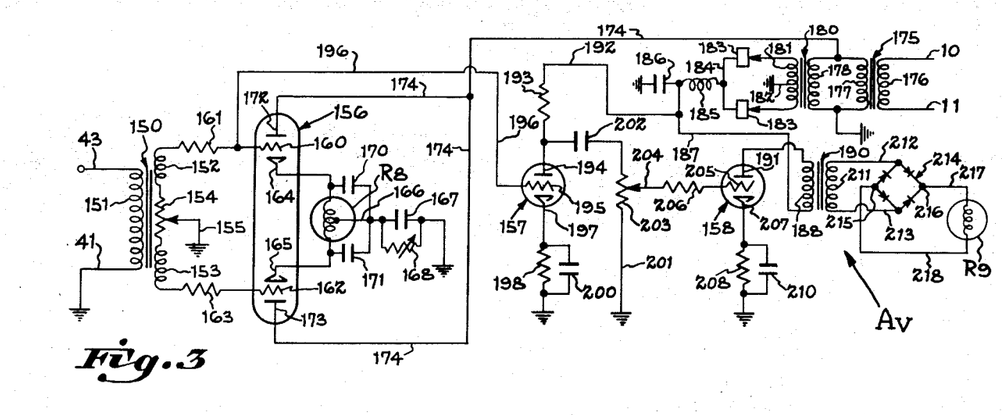
Figure 3 is a schematic circuit diagram of the "velocity" voltage amplifier.
Figure 4:
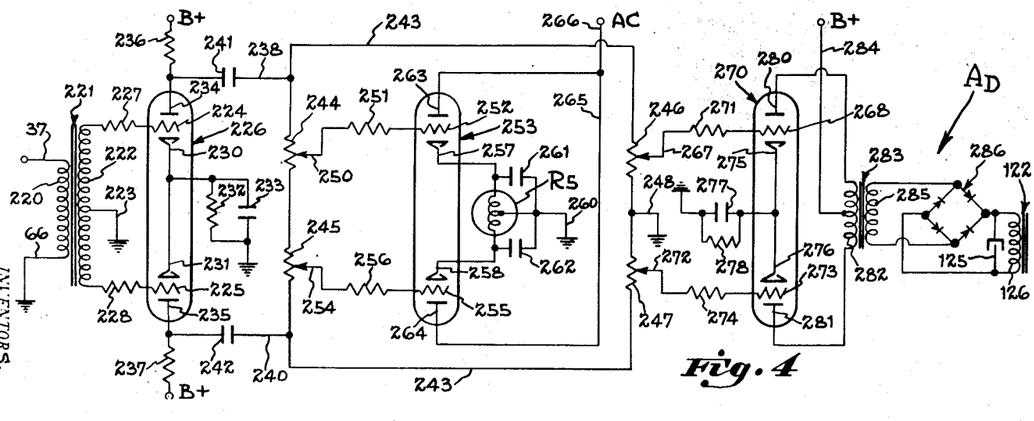
Figure 4 is a schematic circuit diagram of the "error" voltage amplifier.
Figure 5:
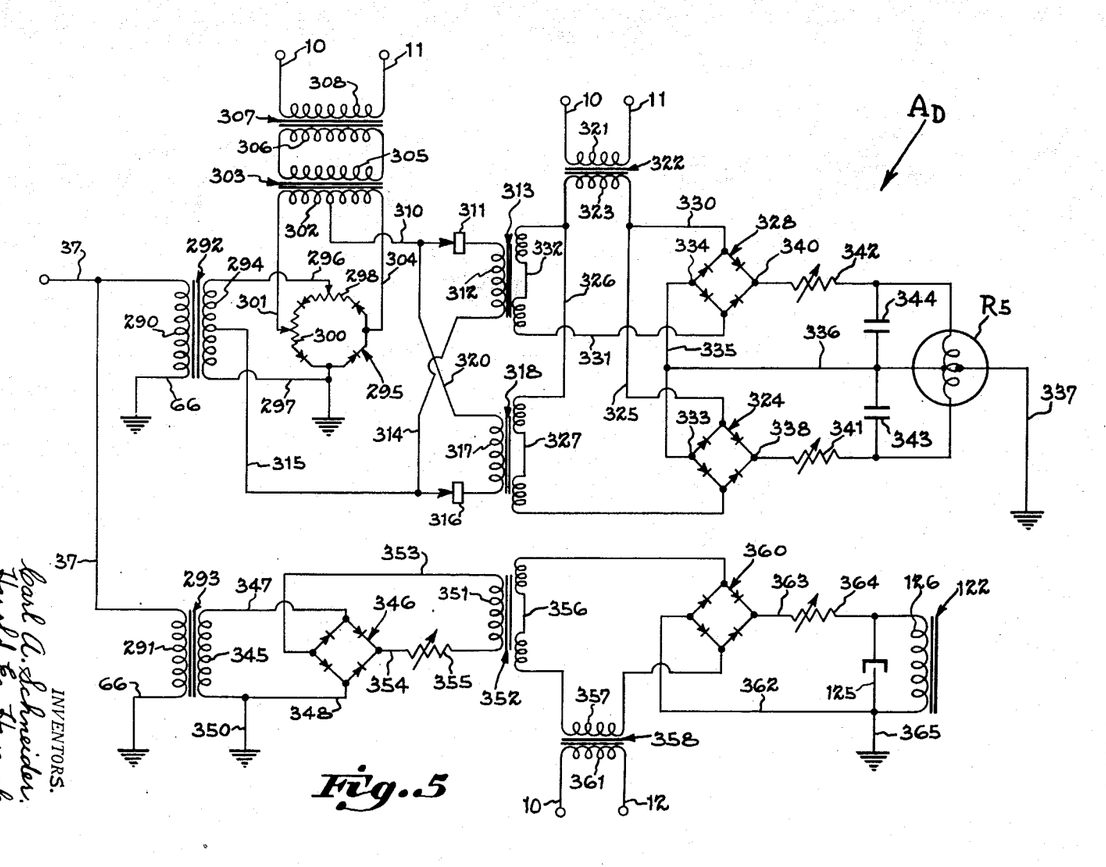
Figure 5 is a schematic circuit diagram of a magnetic "error" voltage amplifier.
Figure 6:
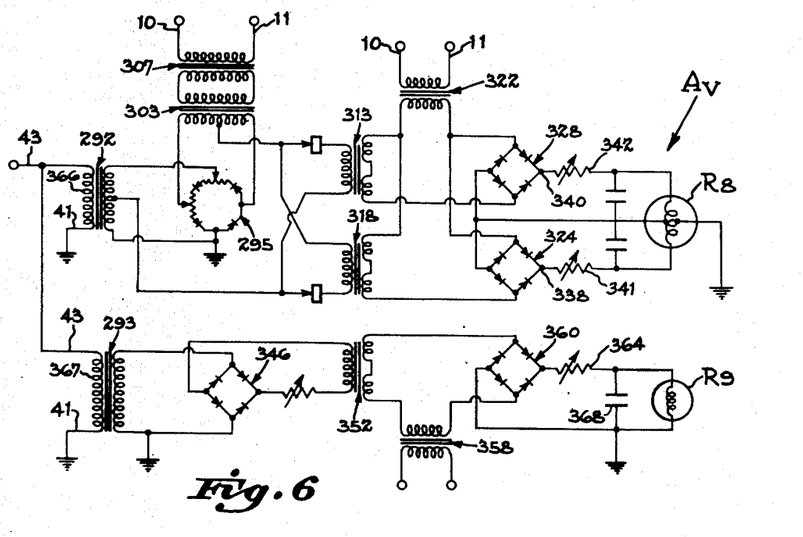
Figure 6 is a schematic circuit diagram of a magnetic "velocity" voltage amplifier.

The velocity amplifier A*v* and driving voltage amplifier A*d* may be of any one of a number of types. Typical electronic amplifiers are shown in Figures 3 and 4, and corresponding magnetic amplifiers are shown in Figures 5 and 6. The construction and functioning of these amplifiers will be described in detail later.

One output channel of the velocity amplifier A*v* energizes relay coil R8 which controls contacts C8 in series with relay coil R10, and contact C28 in series with relay coil R11. A second channel of velocity amplifier A*v* supplies current to relay coil R9 having a contact C9 in line 87 of the call circuit 51. The output of one channel of the driving voltage amplifier A*d* is supplied to magnetic amplifier 122 through leads 123 and 124. A filter condenser 125 is connected across these lines shunting coil 126 of the magnetic amplifier. The other coil 127 of the magnetic amplifier 122 is connected to power line 10 through lead 128. The other end of coil 127 is connected through lead 130 to a conventional bridge rectifier 131. The other A. C. terminal of the rectifier is connected across line 12 through conductor 132. The D. C. terminals 133 and 134 of rectifier 131 are connected to control coil 21 of the saturable reactor through leads 24 and 25. A filter condenser 135 is connected across lines 24 and 25 in parallel with coil 21.

The output of a second channel of the driving voltage amplifier A*d* energizes relay coil R5. Relay R5 is a phase sensitive relay which, when energized, closes either contact C5 in series with relay coil R6 or contact C25 in series with relay coil R7.

Main contactor control circuit

The main contactor control circuit 53 is energized through a conventional bridge rectifier 54 having two A. C. terminals connected across power lines 10 and 12 through leads 136 and 93. The D. C. terminals 137 and 138 of the rectifier are connected to lines 140 and 141. Four lines, 142, 143, 144 and 145, are connected in parallel across lines 140 and 141. Line 142 includes contactor C14 of relay coil R14 and relay R20. Line 143 includes brake solenoid 55 and contact C12 which is actuated by relay coil R12. Line 144 includes contact C13 of relay coil R13 and relay coil R18. Line 145 includes switch 23 and two parallel branches 146 and 147, branch 146 containing contact C36 of relay R6 and contact C10 of relay R10. Branch 147 includes contact C11 of relay R11 and contact C37 of relay R7.

*Velocity amplifier*

One form of an electronic velocity amplifier is shown in Figure 3. As shown, the amplifier includes transformer 150 having a primary winding 151 which is energized through lines 41 and 43. Transformer 150 is provided with two secondary windings 152 and 153, connected in series with a resistance 154 which is grounded through tap 155. The amplifier includes a twin triode tube 156 and two triode tubes 157 and 158. These tubes are provided with the usual cathode heating circuits and bypass condensers which are omitted for the sake of clarity. One grid 160 of tube 156 is connected to secondary winding 152 through resistance 161, while the second grid 162 is connected to secondary 153 through resistance 163. Cathodes 164 and 165 are connected across relay coil R8. Relay R8 is a phase sensitive relay and its coil is provided with a center tap 166 which is grounded through a parallel combination of a condenser 167 and variable resistance 168. Condensers 170 and 171 are respectively connected across the grounded center tap 166 and cathodes 164 and 165.

Plates 172 and 173 of tube 156 are tied together through lead 174 and are connected to a conventional A. C. power supply network. This network includes isolation transformer 175 having a primary winding 176 which is connected across power lines 10 and 11. One end of the secondary winding 177 of this transformer is grounded; the other end is connected to line 174. The primary 178 of a second transformer 180 is also connected across secondary 177. The secondary winding 181 of transformer 180 is provided with a grounded center tap 182, and each end of the secondary is connected to a rectifier 183. The rectifiers are joined through lead 184 which is grounded through inductance 185 and condenser 186. Line 187 is connected to inductance 185. Line 187 is a B+ line and is connected through winding 188 of transformer 190 to plate 191 of tube 158. Lead 192 is connected to lead 187 and provides B+ voltage through resistor 193 to plate 194 of tube 157.

Control grid 195 of tube 157 is tied to grid 160 of tube 156 through lead 196. Cathode 197 of tube 157 is grounded through the parallel combination of resistance 198 and condenser 200. Plate 194 is grounded through lead 201 containing condenser 202 and resistance 203. A tap 204 of resistance 203 is connected to grid 205 of tube 158 through resistance 206. Cathode 207 of tube 158 is grounded through a parallel combination of resistor 208 and condenser 210 similarly to tube 157.

The secondary winding 211 of transformer 190 is connected through leads 212 and 213 to bridge rectifier 214. The D. C. terminals 215 and 216 of this rectifier are connected through leads 217 and 218 to relay coil R9.

The schematic circuit diagram of the driving voltage amplifier is shown in Figure 4. The input of the amplifier is supplied through lines 37 and 66 which are connected to primary 220 of transformer 221. Secondary 222 of this transformer is provided with a grounded center tap 223. The ends of the secondary are connected to grids 224 and 225 of a twin triode tube 226 through resistances 227 and 228. Cathodes 230 and 231 of tube 226 are tied together and grounded through the parallel combination of resistor 232 and condenser 233. Plates 234 and 235 are connected through resistors 236 and 237 to a conventional B+ power supply such as is shown in Figure 3, the ends of resistors 236 and 237 being connected between the condenser 186 and inductance 185.

Plates 234 and 235 are also connected through lines 238 and 240 respectively containing condensers 241 and 242 to line 243. Line 243 contains resistors 244 and 245 which are placed between lines 238 and 240. Line 243 also includes resistors 246 and 247 having a grounded connection 248 between them. Tap 250 picks off resistance 244 and is connected through resistance 251 to grid 252 of twin triode tube 253. Similarly, tap 254 picking off resistance 245 is connected to grid 255 of tube 253 through resistance 256. Cathodes 257 and 258 of tube 253 are connected to relay coil R5. Relay R5 is a phase sensitive relay having grounded center tap 260. Condensers 261 and 262 are respectively connected across the center tap and cathodes 257 and 258. Plates 263 and 264 are connected to line 265. This line is joined to an A. C. power source such as is shown in Figure 3 at 266.

Tap 267 picks off resistance 246 and is connected to grid 268 of twin triode tube 270 through resistance 271. Similarly tap 272 is connected to grid 273 through resistance 274. Cathodes 275 and 276 are tied together and grounded through the parallel combination of condenser 277 and resistance 278. Plates 280 and 281 are connected across primary 282 of transformer 283. Primary 282 is provided with a center tap 284 which is connected to a B+ power supply in a manner similar to that in which resistances 236 and 237 are connected. Secondary 285 of transformer 283 supplies A. C. to a rectifier bridge 286. The D. C. output of this bridge is connected to coil 126 of magnetic amplifier 122 and filter condenser 125 shunting coil 126, as shown in Figure 2.

*Magnetic amplifiers*

A suitable magnetic type driving voltage amplifier is shown in Figure 5. As shown, the amplifier input is taken from lines 37 and 66; and is fed to primaries 290 and 291 of transformers 292 and 293. Secondary winding 294 of transformer 292 is connected across a rectifier network 295 through leads 296 and grounded lead 297. Rectifier network 295 includes resistances 298 and 300. Tap 301 of resistance 300 is connected to secondary 302 of phase reference transformer 303. The other end of secondary 302 is returned to the rectifier network through lead 304. Primary 305 of phase reference transformer 303 is energized from the secondary 306 of isolation transformer 307, having its primary 308 connected across power lines 10 and 11. Secondary 302 of phase reference transformer 303 is center tapped as at 310 and connected through rectifier 311 to coil 312 of reactor 313. The other end of coil 312 is connected through lead 314 to center tap 315 of secondary winding 294. Center tap 315 is also connected through rectifier 316 to coil 317 of reactor 318. The other end of coil 317 is connected to center tap 310 through lead 320.

Primary 321 of isolation transformer 322 is energized from power lines 10 and 11. Secondary 323 is connected across bridge rectifier 324 through leads 325 and 326 and coil 327 of reactor 318. Secondary 323 is also connected across rectifier 328 through leads 330 and 331 and coil 332 of reactor 313. D. C. terminal 333 of rectifier bridge 324 and D. C. terminal 334 of rectifier bridge 328 are connected through line 335. Lead 336 joins line 335 and a center tap of relay coil R5. The center tap is also grounded through lead 337. Terminals 338 and 340 of rectifiers 324 and 328 are connected across the ends of relay coil R5 through variable resistances 341 and 342. Condensers 343 and 344 are respectively connected across line 336 and the ends of relay coil R5.

Secondary 345 of transformer 293 supplies A. C. to rectifier bridge 346 through leads 347 and 348, lead 348 being grounded as at 350. The D. C. terminals of rectifier 346 are connected to coil 351 of reactor 352 through leads 353, 354 and variable resistance 355. Coil 356 of reactor 352 is connected in series with secondary 357 of transformer 358 and rectifier bridge 360. Primary 361 of transformer 358 is energized from main power lines 10 and 11. The D. C. output of rectifier 360 is supplied to coil 126 of amplifier 122 through leads 362 and 363 and variable resistance 364. Filter condenser 125 is connected across winding 126 and grounded as at 365.

The circuit arrangement of the magnetic velocity amplifier shown in Figure 6 is identical with that of the magnetic driving voltage amplifier shown in Figure 5. Of course the size of the component parts in the two amplifiers may be different due to differences in the size of the input voltage or the required output. However, since the arrangement of components is the same, the component parts of the magnetic velocity amplifier have been given the same number as their corresponding parts in the driving voltage amplifier. The only difference between the two amplifiers is that their inputs are taken from different sources, and their outputs energize different elements. Thus the input of the velocity amplifier is taken from coil 65 of the tachometer generator; this input is fed to primaries 366 and 367 through leads 41 and 43. Furthermore, the output of D. C. terminals 338 and 340 of rectifiers 324 and 328 are connected across relay coil R8 instead of R5. Also the D. C. output of rectifier 360 is applied to the shunted combination of relay R9 and condenser 368 rather than to coil 126. In every other respect the circuit arrangements of the other two amplifiers are identical.

*Operation of the circuit*

To illustrate the operation of the circuit, suppose that a cab is stopped at floor 3 and that the cab is called to the first floor either by a person depressing cab button B1 or the floor button F1. In either case, relays R1 and R4 are energized.

Relay R4 controls the application of signals to the amplifiers Av and Ad by closing contacts C44 and C64 and opening contacts C54 and C74, which normally short the amplifier inputs when relay R4 is deenergized.

Relay R1 closes contacts C1 and C21. C21 is a holding contact while C1 connects tap 108 of floor level resistor network 34 to line 37. This tap establishes the floor level signal, indicated as Ef in Figure 7, the voltage from the tap 108 to line 58 being proportional to the distance of the selected floor from an arbitrary reference point. Potentiometer tap 38, due to the mechanical linkage of either the tap or coil 35 with motor 13, moves relative to the coil so that the voltage across line 58 and tap 38 is proportional to the height of the cab from the same arbitrary reference point. This voltage, across the potentiometer, is indicated as Ec in Figure 7. The voltage across lines 37 and 110 thus represents the position error voltage Ep indicating by its magnitude and phase the relative position of the cab and selected floor. This error voltage is applied through lines 37 and 66 to the driving voltage amplifier Ad. With the cab at rest, the output of tachometer 40 is equal to zero and the driving voltage is equal to the position error voltage.

The driving voltage amplifier, whether it is of the electronic type shown in Figure 4 or the magnetic type shown in Figure 5, will energize relay coil R5. Relay R5 is a phase sensitive relay having two contacts C5 and C25; C5 being closed when voltage of one phase is applied across coil R5, and C25 being closed for a voltage of the opposite phase. In this particular instance, with the cab above the selected floor, the output of the voltage amplifier will be of such a phase as to cause relay coil R5 to energize contact C5.

The magnitude of driving voltage required as an input to the driving voltage amplifier Ad to cause relay R5 to operate is controlled by the gain control of the amplifier. In the electronic amplifier shown in Figure 4, this adjustment is made by adjusting taps 250 and 254, and in the magnetic amplifier shown in Figure 5, adjustment is made by adjusting variable resistances 341 and 342. Preferably the gain is adjusted so that relay R5 is operated by a driving voltage corresponding to a cab position error of approximately one-eighth of an inch; although even greater leveling accuracy can be obtained by proper adjustment of the amplifier.

When contact C5 is closed, relay coil R6 is energized closing contacts C6, C26 and C36. Hence a circuit across lines 71 and 75 is completed through leads, 87, 88, 90, 81 and 76 causing relays R1 and R4 to hold in (remain energized) during the rest of the operating cycle, even though the call button initiating the cycle is released.

The output of another channel of amplifier Ad provides saturating current for magnetic amplifier 122 which is used as a power amplifier for the output of this channel of amplifier Ad, and in turn supplies current to control coil 21 of saturable reactor 16. The overall characteristic of this channel of the Ad amplifier, magnetic amplifier 122 and saturable reactor 16 is preferably such that reactor 16 can be completely saturated for an input to the Ad amplifier of a voltage corresponding to a position error of six inches to one foot. This is adjustable by means of a gain control in this channel of the Ad amplifier. For the electronic amplifier, this entails an adjustment of taps 267 and 272, while for a magnetic amplifier as shown in Figure 5, the adjustment can be made by means of variable resistors 355 and 364.

Closing of contact C26 in line 95 completes the circuit containing relay coil R13. Relay R13 actuates contact C13 in line 144 energizing down contactor R18 which closes contacts C18 completing the power supply circuit to motor 13. Simultaneously, relay coils R12 and R15 are energized. Relay R15 closes contact C15 in the power circuit of rectifier 54 so that D. C. power is available in the main contactor control circuit 53. Relay R12 actuates contact C12 in the brake solenoid line, releasing the brake and allowing the cab to be driven downwardly toward the selected floor. At the instant that the down contactor is closed, reactor 16 is in an unsaturated condition so that line coils 17, 18 and 20 have a high impedance. Consequently full line voltage is not applied immediately to motor 13. There will be a short period, determined by the time constant of the Ad amplifier, magnetic amplifier 122 and the reactor itself, during which current builds up in coil 21 and saturates reactor 16. During this build up period, the cab is smoothly accelerated from zero velocity to a velocity substantially equal to the synchronous speed of the motor.

As the cab accelerates, the tachometer voltage output from coil 65 will increase. This has two effects; first, at least part of this voltage appears in series with the potentiometer voltage so that the driving voltage will be reduced by an amount equal to the velocity signal. Second, the velocity signal is supplied to the velocity amplifier Av through leads 41 and 43. The output of the velocity amplifier will energize relay R9 after the cab has reached a predetermined velocity. A gain control is provided in one channel of the Av amplifier for adjustment of the cab speed at which the output of the amplifier is sufficient to close relay R9. Preferably, this adjustment is made so that the relay is operated when the cab is moving at about five per cent of its maximum speed. The only contact of relay coil R9 is contact C9 in the call button circuit. It will be noted that contact C9 is in parallel with contact C6 and its function is to hold the call so long as the elevator cab is moving at a speed greater than five per cent of maximum speed.

After the cab has accelerated so that the motor 13 is preferably running at about ninety per cent of the lowest steady state running speed, or at about eighty to eighty-five per cent of synchronous speed, the output of a second channel of the Av amplifier is sufficient to energize relay R8. As with the first channel, a gain control is provided in the Av amplifier which can be adjusted to vary the speed at which this relay will operate. This adjustment may be made by means of the variable resistor 168 in the electronic amplifier shown in Figure 3, or variable resistances 341 and 342 in the magnetic amplifier shown in Figure 6. When relay R8 is energized, contact C8 is closed, completing the circuit through relay coil R10.

Relay R10 controls a contact C10 in series with contact C36 of relay R6 and switch coil 23. Contact C36 was closed when the driving voltage output of amplifier Ad first energized relay coil R5. Thus the driving voltage amplifier, in effect, conditioned the switch coil energizing circuit for control by the velocity amplifier Av so that when contact C10 is closed, switch coil 23 is energized. The switch coil when energized causes contacts 22 to close, shorting out line coils 17, 18 and 20 of the saturable reactor so that motor 13 may be brought up to maximum speed.

The cab will thus continue to move downwardly until the position error voltage decreases to a point where it will be substantially equal to the velocity voltage. This condition exists when the cab is a few feet from the selected floor and results in the driving voltage being decreased to almost zero volts. When the driving voltage and hence the output of amplifier Ad is decreased to a very small value, relay R5 opens, opening contact C5 and deenergizing relay coil R6. This in turn opens contacts C36, C26 and C6. The opening of contact C26 results in relay coil R13 opening, which in turn opens contact C13 deenergizing down contactor R18 opening the power supply circuit to motor 13. Simultaneously contact C36 results in relay coil 23 being deenergized which opens contacts 22 unshorting the line coils of the saturable reactor.

Since at this instant the driving voltage Ed is negligible, little current is flowing in control coil 21 and reactor 16 is substantially unsaturated. Thus, the impedance of line coils 17, 18 and 20 is relatively high. As the cab continues to move downwardly, the position signal continues to decrease and is exceeded by the velocity signal so that a new driving voltage is developed which is of an opposite phase to the driving voltage previously developed. The new driving voltage is amplified by the A$d$ amplifier and reenergizes relay coil R5, but in such a manner that contact C25 is closed completing the circuit to relay coil R7. Relay R7 closes contacts C7, C27, and C37 which complete the circuits to relay coils R14 and switch coil 23. Contact C14 of relay R14 is in series with up contactor R20 so that when this coil is energized, contacts C20 are closed applying reverse phase sequence voltage to motor 13. The magnitude of the driving voltage E$d$ also determines the amount of current flowing in control coil 21 of the reactor 16, and hence governs the magnitude of the reverse sequence voltage supplied to the motor.

The reverse sequence voltage will plug the motor to a stop, or more specifically will bring the cab to within an one-eighth inch of the floor at a speed lower than five per cent of maximum. When this happens both relays R5 and R9 open, deenergizing relay R7 and opening the three parallel contacts C6, C7 and C9. This results in the call being dropped, deenergizing relays R12 and R15 which open contacts C12 and C15 to apply the mechanical brake. The mechanical brake will hold the cab at the selected floor until a new operating cycle is initiated.

The operation of the electronic velocity voltage and driving voltage amplifiers is conventional, and since these amplifiers constitute no part of the present invention, their operation will not be described in detail in this application. However, since the provision of an all magnetic control system including magnetic driving voltage and velocity voltage amplifiers does constitute one aspect of the present invention, the operation of these amplifiers will be described in somewhat greater detail.

The operation and construction of the magnetic velocity voltage and driving voltage amplifiers are identical so that only the operation of the driving voltage amplifier will be described. In the amplifier, signal transformer 292, phase reference transformer 303 and rectifier network 395 constitute a conventional phase sensitive rectifier, the output of which appears across lines 310 and 315. The output of this phase sensitive rectifier is characterized by the fact that its polarity depends upon the phase relationship between the driving voltage input of transformer 292 and the input of phase reference transformer 303. Also the magnitude of its output is dependent upon the amplitude of the input to transformer 292. Depending upon the polarity of the voltage output of the rectifier, current flows either through coil 317 of reactor 318 or coil 312 of reactor 313. If, for example, line 315 is positive with respect to line 310, conventional current will flow through line 315, rectifier 316, coil 317, lead 320 and through line 310 to the center tap of winding 302 from which it is returned through rectifier network 295 to transformer winding 294.

Current flow through coil 317 of reactor 318 saturates the reactor, lowering the impedance of coil 327. This allows more current produced in secondary 323 of transformer 322 to flow through lines 325, 326 and bridge rectifier 324 thus causing a larger current flow through the lower half of relay coil R5 to ground. Meanwhile, no current is flowing through coil 312 so that coil 332 has a very high impedance and consequently no appreciable current is flowing through bridge rectifier 328 or the upper half of coil relay R5.

Similarly, if the output of the phase sensitive rectifier were such that line 310 were positive with respect to line 315, reactor 313 would be saturated and current would flow through bridge rectifier 328 and the upper portion of relay coil R5 to ground. Depending on which part of coil R5 is energized, either contact C5 or C25 is closed.

The second channel of the driving voltage amplifier operates in a generally similar manner, except that only the amplitude of the output of this channel is of consequence. The output of transformer 293 is proportional to the amplitude of the driving voltage supplied to primary 291. This output is connected to the A. C. terminals of rectifier bridge 346, the D. C. output of this bridge being proportional to its input. Leads 353 and 354 connect the output of rectifier 346 to coil 351 of reactor 352. Reactor 352 includes coil 356 in series with secondary 357 and the A. C. terminals of bridge rectifier 360. The A. C. voltage supplied to this rectifier bridge depends upon the impedance of coil 356, which in turn depends upon the magnitude of the driving voltage. D. C. output of rectifier 360, which is proportional to its A. C. input is supplied to coil 126 of magnetic amplifier 122 which in turn energizes control coil 21 of saturable reactor 16. Thus the current in control coil 21 of saturable reactor 16 is varied with the amplitude of the driving voltage E$d$.

Although not shown, the usual protective devices such as reverse phase sequence relay, limit switch, stop switch, governor switch, and release catch switch can be included in the reactor control system. These devices, for example, could be placed in one of the power lines 93 or 136 energizing rectifier 54.

It will be appreciated that many modifications may be made in the elevator system shown without departing from the scope of the present invention. For example, various features of our elevator control system are applicable to installations having a motor of a type other than single speed induction motor or to installations in which the cab makes only short runs so that shorting contacts are not required and the saturable reactor line coils are never completely removed from the power circuit. The present saturable reactor control system is adapted for use with elevators, hoists and similar devices, operated by either alternating or direct current, and with systems employing either a gear or gearless drive, or even systems in which a hydraulic power drive is controlled by the motor and in turn drives the cab.

When using the saturable reactor control system of the present invention to control a motor driving a movable member other than an elevator cab, such as a crane, a hoist, or a conveyor, the general principles and operation of the control system are the same. More specifically, the motor supply circuit includes the same control elements, namely: motor direction control contactors, and a saturable reactor. The impedance of the saturable reactor and the actuation of the motor direction control contactors are controlled by the output of a comparator circuit just as in an elevator control system. The comparator circuit includes three voltages corresponding to the velocity voltage, floor position signal and cab position signal of an elevator control system; these voltages are: a voltage corresponding to the velocity of the movable member, a voltage corresponding to the selected rest position of the movable member in terms of its distance from an arbitrary reference, and a third voltage corresponding to the position of the movable member with respect to the same arbitrary reference.

The operation of the control system, when employed with any of these other devices, is similar to that previously described in conjunction with elevator control. Generally it may be said that the saturable reactor control system is of great utility wherever problems exist which are similar to those encountered in an elevator system; that is, wherever accurate positioning, smooth acceleration, and deceleration and minimum corrective movements are desired under varying load conditions or at speeds where mechanical braking leads to excessive position inaccuracy.

Having described our invention, we claim:

1. An elevator system comprising a cab, a motor for driving said cab, a power supply circuit for said motor, motor direction control relays, a comparator circuit, means for operating said motor direction control relays in response to said comparator circuit, a saturable reactor, said saturable reactor having a coil in said power supply circuit, means for varying the impedance of said reactor in response to a voltage of said comparator circuit, said comparator circuit having an applied electromotive force equal to the sum of three voltages, the first voltage being dependent upon the position of the cab relative to a predetermined reference, the second voltage being dependent upon the position of a selected floor relative to the same reference, and the third voltage being dependent upon the velocity of the cab.

2. An elevator system comprising a cab, a motor for driving said cab, a power supply circuit for energizing said motor, a comparator circuit, a saturable reactor having coils in said power supply circuit, means for controlling the periods of motor energization in response to said comparator circuit, said means also being effective to reverse the phase sequence of the voltage energizing said motor, said saturable reactor being effective to control said motor speed in response to said comparator circuit, said comparator circuit being constituted by an electromotive force consisting of the sum of a voltage dependent upon the position of said cab relative to a predetermined reference, a voltage dependent upon the position of the selected floor relative to the same arbitrary reference, and a voltage dependent upon the speed of a cab.

3. An elevator leveling system including a cab, a motor for driving said cab, a motor supply circuit for energizing the motor, a saturable reactor having a coil in each line of the motor supply circuit, a comparator circuit, means for selectively energizing said motor to run in one direction or the other, said means being actuated in response to said comparator circuit, said comparator circuit having an applied electromotive force consisting of a first voltage dependent upon the position of the cab relative to an arbitrary reference, a second voltage dependent upon the position of a selected floor relative to the same reference, and third voltage dependent upon the velocity of the cab, said first voltage and said third voltage having a polarity opposed to that of said second voltage.

4. In an elevator system having a plurality of call buttons associated with various floors of a building, the combination of a cab, a motor for driving said cab, a saturable reactor for controlling the speed for said motor, motor direction control contacts, a comparator circuit including a tachometer in mechanical interconnection with said motor whereby the tachometer output voltage is proportional to the velocity of the cab, a comparator circuit voltage supply, a floor resistor network connected to said comparator circuit voltage supply and having a plurality of taps adapted for connecting said resistor network to said comparator circuit, the particular tap interconnecting said floor resistance network being determined by the depression of a call button, the voltage across one end of the resistance network, and said tap being dependent upon the height of the floor associated with said depressed call button from a predetermined reference, a potentiometer connected to said comparator circuit voltage supply and having a coil and a tap, said potentiometer coil and said tap being moved relative to each other in synchronism with the movement of said cab, so that the voltage across one end of the potentiometer coil and tap is proportional to the height of said cab from said predetermined refernce point, the sum of said tachometer voltage, potentiometer voltage and resistance network voltage constituting a driving voltage, said driving voltage being used to control said motor direction control contacts and the impedance of said saturable reactor.

5. In an elevator system for leveling a cab with various floors of a building, a motor for driving said cab, a power supply circuit for energizing said motor, motor direction contactors, a comparator circuit for controlling said motor direction control contacts, a saturable reactor in said power supply circuit for varying the speed of said motor, the impedance of said saturable reactor being responsive to said comparator circuit, said comparator circuit including means for producing a voltage dependent upon the position of the cab relative to a selected floor, and means for producing a voltage dependent upon the velocity of the cab.

6. An elevator system comprising a cab, a motor for driving said cab, a power supply circuit for said motor, means for selectively closing said power supply circuit and energizing said motor to run in one direction or the other, a saturable reactor having a coil in a line of said power supply circuit and being effective to control the speed of said motor, a comparator circuit constituted by an electromotive force consisting of a voltage dependent upon the position of said cab relative to a predetermined reference, a voltage dependent upon the position of the selected floor relative to the same arbitrary reference, and a voltage dependent upon the velocity of a cab, means for amplifying a voltage of said comparator circuit for controlling said saturable reactor.

7. An elevator system comprising a cab, a motor for driving said cab, a power supply circuit for said motor, contact means for selectively closing said power supply circuit and energizing said motor to run in one direction or the other, a saturable reactor having a coil in each line of said power supply circuit and being effective to control the speed of said motor, a comparator circuit constituted by an electromotive force consisting of a voltage dependent upon the position of the cab relative to a predetermined reference, a voltage dependent upon the position of the selected floor relative to the same arbitrary reference, and a voltage dependent upon the velocity of the cab, means for amplifying a voltage of said comparator circuit for controlling said saturable reactor and said contact means.

8. An elevator system comprising a cab, a motor for driving said cab, a power supply circuit for said motor, contact means for selectively closing said power supply circuit and energizing said motor to run in one direction or the other, a saturable reactor having a coil in each line of said power supply circuit and being effective to control the speed of said motor, a comparator circuit constituted by an electromotive force consisting of a voltage dependent upon the position of the cab relative to a predetermined reference, a voltage dependent upon the position of the selected floor relative to the same arbitrary reference, and a voltage dependent upon the velocity of the cab, magnetic means for amplifying a voltage of said comparator circuit for controlling said saturable reactor and said contact means.

9. An elevator system comprising a cab, a motor for driving said cab, a power supply circuit for said motor, motor direction contactors for selectively closing said power supply circuit and energizing said motor to run in one direction or the other, a saturable reactor having a coil in a line of said power supply circuit and being effective to control the speed of said motor, a comparator circuit including an electromotive force consisting of a voltage dependent upon the position of said cab relative to a predetermined reference, a voltage dependent upon the position of the selected floor relative to the same arbitrary reference, and a velocity voltage dependent upon the speed of said cab, means for amplifying the sum of these three voltages and means for amplifying said velocity voltage, whereby said amplified voltages are effective to control the operation of said motor direction contactors and said saturable reactor.

10. An elevator system for leveling a cab with various floors of a building, comprising a motor for driving said cab, a power supply circuit for energizing said motor, motor direction contactors, a comparator circuit for controlling said motor direction control contactors, a saturable reactor having line coils in said power supply circuit and a control coil, the impedance of said line coils being a function of the current in said control coil, the current flowing in said control coil of said saturable reactor being responsive to said comparator circuit, said comparator circuit including means for producing a voltage having an amplitude and phase dependent upon the position of the cab relative to a selected floor, and means for producing a voltage having an amplitude and phase dependent upon the velocity of the cab and direction of its movement.

11. In an elevator system for leveling a cab with various floors of a building, a motor for driving said cab, a power supply circuit for energizing said motor, motor direction contactors, a comparator circuit for controlling said motor direction control contactors, a saturable reactor in said power supply circuit for varying the speed of said motor, the impedance of said saturable reactor being responsive to said comparator circuit, said comparator circuit including means for producing a position error voltage dependent upon the position of the cab relative to a selected floor, means for producing a voltage dependent upon the velocity of the cab, and means for comparing said voltage, said velocity voltage becoming greater than said position error voltage when said cab approaches the selected floor, whereby said comparator circuit is effective to actuate said motor direction contactors to supply reverse phase sequence voltage to said motor for plugging said cab to a stop, the amount of plugging being controlled by said saturable reactor.

12. An elevator system comprising a cab, a motor for driving said cab, a saturable reactor for varying the speed of said motor, up and down contactors for controlling the energization of said motor, a comparator circuit for controlling said up and down contactors and said saturable reactor, said comparator circuit including a first alternating voltage having an amplitude proportional to the speed of the cab and a phase dependent upon the direction of cab movement, a second alternating voltage having an amplitude dependent upon the height of said cab from an arbitrary reference, and a third alternating voltage having an amplitude proportional to the height of the cab from the same arbitrary reference, said first and said third voltages being of the same polarity and opposed to the polarity of said second voltage.

13. An all magnetic elevator control system comprising an elevator cab, a motor for driving said cab, motor direction contactors, a saturable reactor for varying the speed of said cab, a comparator circuit including means for producing a voltage dependent upon the relative position of the cab and selected floor, and means for producing a velocity voltage dependent upon cab speed, the sum of said voltages constituting a driving voltage, magnetic amplifiers for amplifying said driving voltage and said velocity voltage to control the saturable reactor and the motor contactors.

14. An all magnetic elevator control system comprising an elevator cab, a motor for driving said cab, motor direction contactors, a saturable reactor for varying the speed of said cab, a comparator circuit including means for producing a voltage dependent upon the relative position of the cab and selected floor, and means for producing a voltage dependent upon cab velocity, a magnetic amplifier for amplifying the sum of said voltages to control the saturable reactor and the motor contactors.

15. In combination with a polyphase motor for driving a member movable with respect to another object, a power supply circuit for said motor, an all magnetic control means for operating said motor to move said member in a predetermined manner, said control system comprising motor direction control contactors, a saturable reactor, said saturable reactor having line coils in said motor power supply circuit, a comparator circuit including means for producing a voltage dependent upon the relative position of the movable object and its selected rest position, and means for producing a voltage dependent upon the velocity of the movable object and a magnetic amplifier for amplifying the sum of said voltages to control the saturation of the saturable reactor and the actuation of motor control contactors.

16. An electrical control system for electrically driven member relatively movable with respect to another object, said electrical control system including a motor for driving said movable member into a predetermined rest position, a power supply circuit for said motor, means for selectively closing said power supply circuit and energizing said motor to run in one direction or the other, a saturable reactor having a coil in a line of said power supply circuit and being effective to control the speed of said motor, a comparator circuit constituted by an electromotive force consisting of a voltage dependent upon the position of said movable member relative to a predetermined reference, a voltage dependent upon the rest position of said movable member relative to the same arbitrary reference, and a voltage dependent upon the velocity of the movable member, means for amplifying a voltage of said comparator circuit for controlling said saturable reactor.

17. An electrical control system for electrically driven member relatively movable with respect to another object, said electrical control system including a motor for bringing said movable member into a predetermined rest position, a power supply circuit for said motor, contact means for selectively closing said power supply circuit and energizing said motor to run in one direction or the other, a saturable reactor having a coil in each line of the power supply circuit and being effective to control the speed of said motor, a comparator circuit constituted by an electromotive force consisting of a voltage dependent upon the position of the movable member relative to a predetermined reference, a voltage dependent upon the displacement of the rest position from the same arbitrary reference and a voltage dependent upon the velocity of the movable member, means for amplifying a voltage of said comparator circuit for controlling said saturable reactor and said contact means.

18. In an elevator system comprising a cab and a motor for driving the cab, means for levelling said cab with various floors of the building, said means comprising a power circuit for energizing said motor, a comparator circuit including means for introducing a signal dependent upon the position of the cab relative to the selected floor, means for producing a signal dependent upon the velocity of the cab, and means for comparing said signals, a saturable reactor having a coil in said power circuit, the impedance of said reactor being responsive to the signal comparison in said comparator circuit, means responsive to said signal comparison in the comparator circuit for applying reverse phase sequence voltage to said motor.

19. In an elevator system comprising a cab and a motor for driving the cab, means for levelling said cab with various floors of the building, said means comprising a power circuit for energizing said motor, a comparator circuit including means for producing a signal dependent upon the position of the cab relative to an arbitrary reference, means for producing a signal dependent upon the position of the selected floor relative to a selected reference, and means for comparing said signals, a saturable reactor having a coil in said power circuit, the impedance of said reactor being dependent upon the signal comparison in said comparator circuit, means responsive to said comparator circuit for applying reverse phase sequence voltage to said motor.

20. In an elevator system comprising a cab and a motor for driving the cab, means for levelling said cab with various floors of the building, said means comprising a power circuit for energizing said motor, a comparator circuit including means for producing a signal dependent upon the position of the cab relative to an arbitrary reference, means for producing a signal dependent upon the position of the selected floor relative to a selected reference, and means for comparing said signals, a saturable reactor having a line coil in said power circuit, and a control coil in circuit connection with said comparator circuit, whereby the impedance of said reactor is responsive to the signal comparison in said comparator circuit, means responsive to said comparator circuit for applying reverse phase sequence voltage to said motor.

References Cited in the file of this patent

UNITED STATES PATENTS

| Number | Name | Date |
|---|---|---|
| 2,508,158 | Hanna | May 16, 1950 |
| 2,557,179 | Fish et al. | June 19, 1951 |
| 2,565,137 | Wickerham et al. | Aug. 21, 1951 |